United States Patent [19]

Hennick et al.

[11] Patent Number: 5,065,001

[45] Date of Patent: Nov. 12, 1991

[54] ADJUSTABLE WEAR PLATE BADGE READER

[75] Inventors: Robert J. Hennick, Auburn; John M. Pidhirny, Skaneateles, both of N.Y.

[73] Assignee: Welch Allyn, Inc., Skaneateles Falls, N.Y.

[21] Appl. No.: 385,497

[22] Filed: Jul. 26, 1989

[51] Int. Cl.⁵ .................. G06K 7/00; G06K 13/06; G06K 13/063; G11B 25/04
[52] U.S. Cl. .................... 235/435; 235/484; 235/485; 360/2
[58] Field of Search ............. 235/435, 475, 484, 483, 235/485, 449, 454, 482; 360/2

[56] References Cited

U.S. PATENT DOCUMENTS

| | | | |
|---|---|---|---|
| 3,925,814 | 12/1975 | Chernowitz | 360/2 |
| 4,151,564 | 4/1979 | Schreiber et al. | 235/449 |
| 4,231,072 | 10/1980 | Toyama | 360/88 |
| 4,267,439 | 5/1981 | Thomas et al. | 235/454 |
| 4,396,902 | 8/1983 | Wartham et al. | 382/64 |

FOREIGN PATENT DOCUMENTS

| | | | |
|---|---|---|---|
| 0048607 | 7/1986 | European Pat. Off. | 235/484 |
| 0057503 | of 1969 | Poland | 235/484 |

Primary Examiner—Stuart S. Levy
Assistant Examiner—Christopher R. Glembocki
Attorney, Agent, or Firm—Wall and Roehrig

[57] ABSTRACT

A card or badge reader is provided for reading badges or cards on which there are coded indicia such as a bar code symbol. The reader has a front wall plate that is removably affixed onto the front of the main housing, but separated a slight amount to define a badge reader slot. A wear plate is disposed horizontally between the front wall plate and the front wall of the main housing to define a floor for the badge reader slot. The wear plate comprises an elongated web with downturned end flanges, and is suspended in one of a plurality of parallel horizontal grooves in the front wall plate. The position of the wear plate can be changed from one of these grooves to another, as desired.

6 Claims, 1 Drawing Sheet

ADJUSTABLE WEAR PLATE BADGE READER

BACKGROUND OF THE INVENTION

This invention relates to card or badge readers on which there are coded indicia such as a bar code. The invention is more particularly directed to a swipe-type badge reader with an adjustable wear plate for reading badges in which a bar code symbol or other optical code device is situated at a predetermined distance from one edge of the badge.

There has been an increased popularity of bar-coded badges, both for security access systems and for time and attendance purpose. In reading bar-coded identification badges, the bar-coded area on the badge should be positioned to move reliably past the bar code reader in the reading device. However, from one business to another or from one company division to another, there can be variations in the sizes of the badges and in the placements of the bar code symbol.

In a swipe-type card or badge reader, the user draws his or her badge through a badge-reader slot in the device, with the badge being oriented so that the bar code symbol faces the bar code scanner in the device the badge passes through. The floor of the slot is defined by a wear plate against which the edge of the badge slides. The wear plate defines a predetermined height from the floor of the badge reader slot to an optical center line of the bar code scanner. Of course, for optimal operation, this height should correspond to the distance from the edge of the badge to the center line of the bar code symbol on the badge. However, as aforesaid, not all bar-coded badges are of the same design, and the distance of the bar code symbol from the edge of the badge can vary. Difference in this distance from one card to another is often intentional, so that a badge from one organization or division will not be readable on a badge reader in another organization or division.

Variable slot readers have been proposed as magnetic or optical check readers for reading codes on checks or bank drafts. One such device is described in U.S. Pat. No. 4,396,902. In this device a thumb wheel is turned to move an optical reading aperture up or down relative to the base of a slot (i.e., relative to the edge of the document). The document position remains constant so that the distance from the edge to a magnetic stripe reader is fixed. This type of device requires individual adjustment for each optically-coded check or other document, but would not be appropriate for a bar code badge reader where large numbers of employee badges are to be read in short intervals of time.

It has also been proposed to standardize bar-coded badge characteristics, especially the distance form the edge of the badge to the bar code symbol. However, this would eliminate the flexibility of having bar code badge readers set up to read only some badges from a particular organization, but not others, as mentioned earlier.

OBJECTS AND SUMMARY OF THE INVENTION

It is an object of this invention to provide a badge reader which accommodates badges having coded symbols thereon.

It is another object of this invention to provide a badge reader in which the height of an optical center line above a wear plate is adjustable to accommodate badges in which a coded symbol is disposed a selected predetermined distance from an edge of the badge.

It is a more specific object to provide a badge reader in which the position of the wear plate is user-adjustable with ordinary tools, and without need to move or manipulate any optical devices.

According to an aspect of this invention, a bar-code badge reader has a main housing that contains an optical scanner that views through a front wall of the main housing to scan the bar code symbol on a badge, which can be in the form of a laminated plastic card. A front wall plate is removably affixed onto the front of the main housing, but is separated therefrom to define a slot that accommodates the width of the badge. A wear plate is disposed horizontally between the front wall plate and the front wall of the main housing to define a floor for the badge reader slot at a selected predetermined distance below the optical scanner. The wear plate is in the form of an elongated web or strip to extend substantially the length of the badge reader slot. On the slot side of the front wall plate there are several vertically spaced, horizontal channels or grooves. The wear plate is held by one edge in an appropriate one of these grooves to establish the appropriate vertical distance from the wear plate to the scanner optical center line. Alternatively, these grooves can be in the front wall of the main housing, or in both places. The height-to-optical-center-line adjustment can be easily effected by the user or customer. This is carried out by unfastening the front wall plate, which is held by a pair of conventional threaded screws. Then the wear plate can be moved from one groove to another, and the front wall plate reattached onto the main housing. Once established, the vertical spacing does not slip or drift.

In a preferred arrangement, the front wall plate is molded of a suitable rigid and durable synthetic resin material, with three horizontal wear-plate grooves extending across its width and vertical grooves at each end. The wear plate is in the form of an elongated web whose length equals the groove length. Downturned flanges at ends of the elongated web fit into the vertical grooves.

Many other objects, features, and advantages of this invention will present themselves to those skilled in the art upon considering the ensuing description of a preferred embodiment, which is to be read in connection with the accompanying drawing.

DETAILED DESCRIPTION OF THE PREFERRED EMBODIMENT

Figure 1:
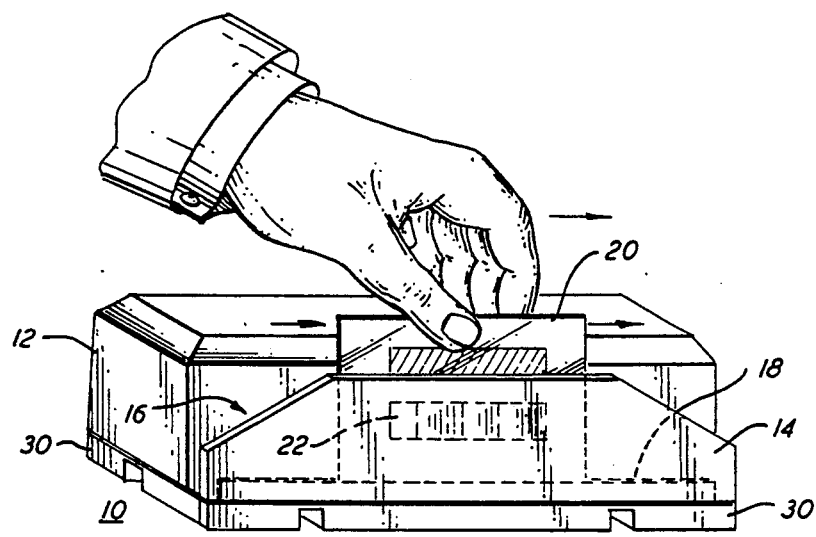
FIG. 1 is a perspective view of an optical bar-code badge reader according to one embodiment of the present invention.

With reference to the Drawing and initially to FIG. 1 thereof, a badge reader device 10 has a main housing 12 and a front wall plate 14 spaced from it to define a card or badge reader slot 16. A horizontal wear plate 18 serves as a floor at the base of the slot 16. This arrangement is a swipe-type reader, and as shown in FIG. 1, a user draws or pushes a badge 20 by hand through the slot 16 for security access, or for identification or attendance purposes. Typically, the badge 20 is a photo I.D. type containing an employee photo on one side and a bar code symbol 22 on the same or other side. The bar code symbol 22 is situated parallel to one edge and a predetermined distance away from that edge of the card or badge 20. The employee photo, bar code symbol 22, and other materials on the badge 20 are typically laminated between clear plastic coverings. The badge 20 is swiped through the slot 16 with the bar code symbol 22 disposed towards the main housing 12, and an optical scanner 24 of known design (shown in ghost in FIG. 5) reads the bar code symbol. The scanner 24 is situated viewing towards the front wall plate 14 at a defined optical center line 26.

Figure 2:
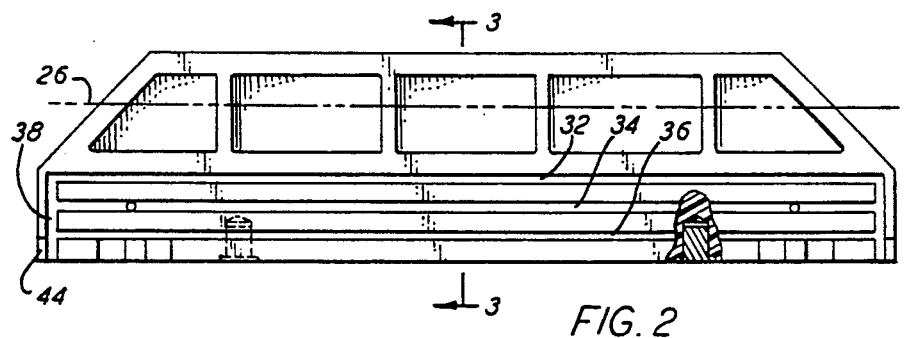
FIG. 2 is an elevation of a detachable front wall plate of the embodiment of FIG. 1.
Figure 3:
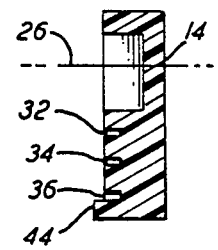
FIG. 3 is a cross-sectional view of the front wall plate, taken at 3—3 in FIG. 2.
Figure 4:
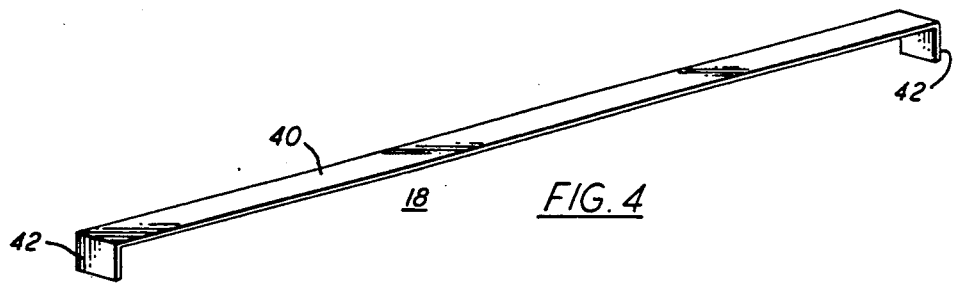
FIG. 4 is a perspective view of an elongated wear plate of this embodiment of the invention.

As shown in FIGS. 2 and 3, the front wall plate 14, preferably molded of a durable plastic synthetic resin, is coupled by a screw fasteners 28 to a base 30 of the main housing 12. On the side of the front wall plate 18 that faces the main housing 12 there are first, second, and third transverse grooves 32, 34, 36 that are parallel to one another and at predetermined spacings below the optical center line 26. Vertical grooves 38 at the ends of the front wall plate 14 connect to the horizontal grooves 32, 34, 36. As shown in FIG. 4, the wear plate 18 is formed as an elongated web or strip 40 having a length to match the lengths of the grooves 32, 34, 36 and with bent-down end flanges 42 that fit into the vertical grooves 38.

In a practical embodiment, the wear strip web 40 and the grooves 32, 34, 36 are about 5 ⅜" long. The wear strip has a width of about ¼" while the grooves 32, 34, 36 have a depth of about ⅛". The grooves are also spaced below the optical center line 26 a distance of 0.450", 0.650", and 0.825" respectively. The bent-down end flanges 42 are about 0.45" long in this embodiment.

As also shown in FIG. 3, a protuberance 44 at the lower edge of the front wall plate 14 on the side thereof that faces the main housing 12 establishes a width of the badge reader slot 16. In this example, the protuberance 44 defines a slot width of 0.055". However, this can vary from one reader to another.

Figure 5:
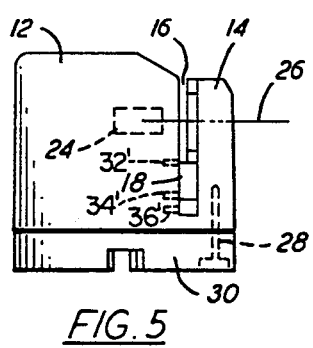
FIGS. 5, 6, and 7 are side elevations of the badge reader of this embodiment, with the wear plate disposed at first, second, and third positions, respectively.
Figure 6:
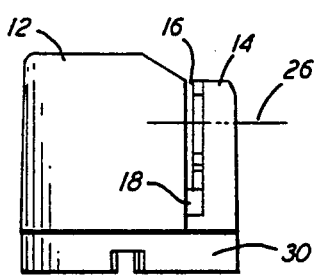
Figure 7:
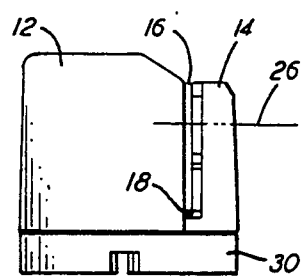

To establish a proper spacing from the wear plate 18 to the optical center line 26, that is, to correspond to a predetermined spacing for the bar code symbol 22 from the edge of the badge 20, the front wall plate 14 can be removed from the base 30 by unscrewing the fasteners 28. Then, the wear plate 18 can be situated in the appropriate one of the grooves 32, 34, or 36. After that the front wall plate 14 is reattached onto the base 30. With the wear plate 18 in the uppermost groove 32, t center line height of 0.450" is established as illustrated in FIG. 5. With the wear plate in the second groove 34 or the bottom groove 36, a center line height of 0.650" or 0.825" is established as shown in FIGS. 6 and 7, respectively.

In this embodiment, the badge 20 is moved by hand through the reader, but in other embodiments a capstan and press roller arrangement could be employed. Also, while this embodiment can be adjusted among three heights, a different number of grooves or different spacings of the horizontal grooves 32, 34, 36 could be used, as required for a particular use. It should be appreciated that changing of the wear plate position can be carried out by the end user without special tools or special skills being required, and the position of the wear plate 18, once adjusted, will not slip.

In an alternative construction, grooves 32', 34', 36' can be provided on the front wall of the housing 12, as shown in ghost line in FIG. 5. These grooves can be provided instead of the corresponding horizontal grooves, 32, 34, 36, or in addition to them, for supporting the wear plate 18.

Terms of orientation, such as front, bottom, vertical, etc., are employed here for reasons of simplicity in explaining the invention with reference to the preferred embodiment. However, it should be understood that the principles of this invention could reside in badge readers constructed of different orientation.

While this invention has been described in detail with respect to one preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. A badge reader comprising a main housing, an optical reader which views through a front wall of the main housing for reading optical indicia in a coded area that is spaced a selected predetermined distance from one edge of said badge, a front wall plate that is spaced a predetermined distance from the front wall of the main housing over said optical reader to define a badge reader slot through which said badge is moved to bring the coded area of the badge past optical reader, and a wear plate disposed horizontally between the front wall plate and the front wall of the main housing to define a floor of said badge reader slot at a selected predetermined vertical distance below said optical reader; wherein said wear plate is formed as an elongated flat web separate from said front wall plate and said main housing, and extends substantially the length of the badge reader slot, and wherein said front wall plate has a plurality of spaced horizontal grooves therein in one of which said wear plate web is disposed such that the vertical position of said wear plate is adjustable by removing the front wall plate from said main housing, placing the wear plate in an appropriate one of said plurality of grooves to establish a desired predetermined vertical distance from the wear plate to said optical reader, and then reassembling the front wear plate onto said main housing.

2. A badge reader according to claim 1, wherein said front wall plate is molded of a synthetic resin with said horizontal grooves molded therein.

3. A badge reader according to claim 1 wherein said wear plate includes downturned end flanges at longitudinal ends of said web.

4. A badge reader according to claim 3 wherein said horizontal grooves are spaced apart vertically by predetermined amounts and extend a horizontal length corresponding to the length of the wear plate, and there are vertical channels which join the ends of said horizontal groove sand accommodate the downturned flanges of said wear plate.

5. A badge reader comprising a main housing, an optical reader which views through a front wall of the main housing for reading optical indicia in a coded area that is spaced a selected predetermined distance from one edge of said badge, a front wall plate that is spaced a predetermined distance from the front wall of the main housing over said optical reader to define a badge reader slot through which said badge is moved to bring the coded area of the badge past said optical reader, and a wear plate disposed horizontally between the front wall plate and the front wall of the main housing to define a floor of said badge reader slot of a selected predetermined vertical distance below said optical reader; wherein said wear plate is formed as an elongated flat web separate from said front wall plate and said main housing, and extends substantially the length of the badge reader slot, and wherein said main housing front wall has a plurality of spaced horizontal grooves therein in one of which said wear plate web is disposed such that the vertical position of said wear plate is adjustable by removing the front wall plate from said main housing, placing the wear plate in an appropriate one of said plurality of grooves to establish a desired predetermined vertical distance from the wear plate to said optical reader, and then reassembling the front wear plate onto said main housing.

6. A badge reader according to claim 5 wherein said horizontal grooves are provided on both said main housing front wall and on said front wall plate for supporting said wear plate web.

* * * * *